US006277484B1

(12) United States Patent
Shimoda et al.

(10) Patent No.: US 6,277,484 B1
(45) Date of Patent: Aug. 21, 2001

(54) MAGNETIC RECORDING MEDIA AND METHOD OF PRODUCING THE SAME

(75) Inventors: Kazumasa Shimoda; Ryoichi Mukai; Hiroto Takeshita, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/167,837

(22) Filed: Oct. 7, 1998

(30) Foreign Application Priority Data

May 15, 1998 (JP) .................................................. 10-150765

(51) Int. Cl.$^7$ ....................................................... G11B 5/66
(52) U.S. Cl. ...................... 428/332; 428/336; 428/694 T; 428/694 TS; 428/900; 204/192.2
(58) Field of Search .................... 428/694 T, 694 TS, 428/900, 337, 336; 204/192.2

(56) References Cited

U.S. PATENT DOCUMENTS

| 5,658,659 | 8/1997 | Chen et al. ............................ 428/332 |
| 5,800,931 | * 9/1998 | Lee ........................................ 428/611 |
| 5,908,514 | * 6/1999 | Ranjan ................................. 148/313 |
| 5,939,202 | * 8/1999 | Ataka .................................... 428/457 |
| 6,020,060 | * 2/2000 | Yoshida ................................ 428/332 |
| 6,045,931 | * 4/2000 | Song ................................ 428/694 TS |
| 6,077,586 | * 6/2000 | Bian ..................................... 428/65.3 |
| 6,090,496 | * 7/2000 | Kanazawa ............................. 428/617 |

FOREIGN PATENT DOCUMENTS

| 5325163 | 12/1993 | (JP) . |
| 696431 | 4/1994 | (JP) . |

OTHER PUBLICATIONS

Chemical Segregation in CoNiPt(SiO$_2$) Alloy Film; Akihiro Murayama and Masao Miyamura; Appl. Phys. Lett. vol. 65, No. 9; Aug. 29, 1994; pp. 1186–1188.

Magnetic Properties of Sputtered Co–Pt Thin Films; Masahiro Kitada and Noboru Shimizu; J. Appl. Phys. No. 12; Dec. 1983; pp. 7089–7094.

* cited by examiner

Primary Examiner—Leszek Kiliman
(74) Attorney, Agent, or Firm—Greer, Burns & Crain, Ltd.

(57) ABSTRACT

A magnetic recording medium using a substrate, such as a glass substrate, and having, in combination, superior magnetic and magnetic recording properties and good adhesion of a magnetic layer to the substrate. The magnetic recording medium has an intermediate layer of chromium between the substrate and an underlayer of Ni-based non-magnetic material on which a magnetic layer of Co-based magnetic alloy is superimposed. A method of producing the magnetic recording medium is also disclosed, wherein each of the layers is formed by a sputtering process at a sufficient pressure to promote granular growth of crystals of the layer.

15 Claims, 5 Drawing Sheets

MAGNETIC RECORDING MEDIA AND METHOD OF PRODUCING THE SAME

BACKGROUND OF THE INVENTION

1. Field of the Invention

The invention relates to storage devices and, particularly, to magnetic recording media used in storage devices such as hard disks for computers, and a method for the production thereof.

2. Description of the Related Art

A magnetic recording medium used in a hard disk or the like is made up of a non-magnetic substrate and thin films of magnetic materials formed on the substrate. Performance of a thin magnetic layer is prone to be effected by the material of an underlying layer. It is thus common to provide an underlayer between a magnetic layer and a non-magnetic substrate in order to improve performance of the magnetic layer.

At present, a magnetic recording medium in which an underlayer of chromium (Cr), nickel (Ni), or an alloy based on them is formed on a non-magnetic substrate, and on which a film of alloy based on cobalt (Co), such as a Co—Cr—Ta alloy, Co—Cr—Pt alloy or the like, is formed, is used as a medium allowing a high storage density. Hard disks for computers are required to have large storage capacity, and to this end, it is required that magnetic recording media have a much higher storage density. Thus, magnetic recording media is required to have a higher coercivity and a reduced media noise.

On the other hand, magnetic recording media represented by hard disks are requested to have smoothness and resistance to shock due to a recent trend towards a small head flying height. Accordingly, glass substrates which are superior in those properties to the aluminum substrates predominantly used at present are attracted attention. Examples of magnetic recording media using a glass substrate are given in Japanese Unexamined Patent Publications No. 6-96431, No. 5-325163, etc., all of which use Cr or an alloy thereof for an underlayer under a magnetic layer. They also describe interposing an intermediate layer of Cu, Ti, Al or the like between the Cr layer and the glass substrate in order to improve the magnetic properties and the recording and read back properties. For example, Japanese Unexamined Patent Publication No. 6-96431 discloses a magnetic recording medium in which an intermediate layer of Cu or the like is interposed, so as to prevent oxygen and the like, from a substrate, from reaching a Cr underlayer and make (110) face of Cr parallel to the surface of a substrate, to thereby improve the magnetic and magnetic recording properties.

Japanese Unexamined Patent Publication (Kokai) No. 8-171716 discloses a magnetic recording medium in which an underlayer consisting of a compound of Ni and P is directly formed on a non-magnetic substrate. However, a magnetic recording medium in which a Ni-based non-magnetic compound is used for an underlayer, and an intermediate layer is interposed between a glass substrate and the underlayer, is not known.

SUMMARY OF THE INVENTION

In the aforementioned magnetic recording medium using the Cr alloy underlayer, as described in, for example, Japanese Unexamined Patent Publication No. 6-96431, it is required to heat the substrate during a manufacturing process to improve properties of the film of magnetic material, as described in its examples. Heating the substrate leads to the emission of adsorbed gases from the substrate and into the chamber for film formation, resulting in increased pressure in the chamber. Amounts and types of emitted gases vary depending on humidity and conditions of film deposition in the chamber, and these gases cause unstable properties of the formed magnetic film. Consequently, it is preferred that heating of the substrate is not carried out to obtain more stable properties.

In the aforementioned magnetic recording medium using the underlayer of an Ni-based compound (Japanese Unexamined Patent Publication (Kokai) No. 8-171716), the underlayer consisting of a compound of Ni and P is directly formed on the non-magnetic substrate. It has been found, by experiment, that the direct formation of an underlayer of Ni—P compound ($Ni_3P$) results in poor adhesion between the underlayer and the substrate. (See Comparative Example 1 below.)

Thus, a magnetic recording medium which uses a glass substrate and has, in combination, superior magnetic and magnetic recording properties and good adhesion of an underlayer to the substrate, has not hitherto be attained.

Accordingly, the invention aims to provide a magnetic recording medium which has these desired properties in combination and is suitable for high storage density recording, to thereby meet a demand for much higher coercivity and reduced media noise to improve the storage density.

The invention provides a magnetic recording medium comprising a substrate, a magnetic layer of Co-based magnetic alloy, and an underlayer of Ni-based non-magnetic material interposed between the substrate and the magnetic layer, wherein the magnetic recording medium further comprises an intermediate layer of Cr between the substrate and the underlayer.

The magnetic recording medium of the invention is produced by a method which comprises providing a substrate, forming an intermediate layer of Cr on the substrate, forming an underlayer of Ni-based non-magnetic material on the intermediate layer, and forming a magnetic layer of Co-based magnetic alloy on the underlayer, wherein each of the layers is formed by a sputtering process at a sufficient pressure to promote granular growth of crystal of the layer.

BRIEF DESCRIPTION OF THE DRAWINGS

The above and other objects and advantages of the invention will be well understood and appreciated by a person with ordinary skill in the art, from consideration of the following detailed description made by referring to the attached drawings, wherein.

DETAILED DESCRIPTION OF THE INVENTION

In the invention, any glass substrate which is commonly used as a substrate for a magnetic recording medium, such as a substrate made of a glass material such as, for example, a chemically strengthened glass or a crystallized glass, may be used. In addition to glass substrates, the invention is applicable to any substrate used as a substrate for magnetic recording medium, including aluminum, carbon, silicon, and plastic substrates.

The Co-based magnetic alloy used in the invention is an alloy obtained by adding non-magnetic oxide of $SiO_2$ to a Co—Cr—Pt or Co—Pt alloy containing cobalt as a main component, the Co—Cr—Pt and Co—Pt alloys having $SiO_2$ added being represented herein by Co—Cr—Pt—$SiO_2$ and CO—Pt—$SiO_2$ alloys, respectively. Thus, the Co-based magnetic alloy used in the invention contains Pt and $SiO_2$ in addition to the main component of Co, and optionally contains Cr.

In the case of Co—Pt—$SiO_2$ alloy free of Cr, the alloy contains 6 to 45 at % of Pt, more than 0 mol % and less than 6 mol % of $SiO_2$, and the balance of Co and inevitable impurities.

Pt has a function of enhancing an anisotropic magnetic field (Hk) of a magnetic film and increasing a coercivity. This function becomes more noticeable at an Pt content of 6 at % or more. At a further increased Pt content, the coercivity exceeds 4 kOe (318 kA/m), at which current magnetic heads cannot perform magnetic recording. According to a publication by Masahiro Kitada and Noboru Shimizu, J. Appl. Phys., vol. 54, No. 12, p7089 (1993), about 20 at % of Pt added to Co gives a maximum coercivity. Considering that a practical coercivity is a tenth of that maximum coercivity, addition of Pt in an amount of 6 to 45 at % is useful. Therefore, the upper limit of amount of Pt added in the present invention is 45 at %. The preferred amount of Pt added is more than 6 at % and not more than 12 at %.

$SiO_2$ is thought to segregate on grain boundary of a magnetic film (A. Murayama et al., Appl. Phys. Lett. vol. 65, 1186 (1994)), and has the function of highly enhancing a coercivity in a small amount. Transmission electron microscopy has revealed that the addition of $SiO_2$ causes the crystal grain diameter of the magnetic film to be reduced, which makes it possible to effect a reduction in medium noise. However, an excessive addition of $SiO_2$ leads to a reduced anisotropic magnetic field (Hk) as well as a reduced coercivity. In view of these effects, it is preferred that the amount of $SiO_2$ added is more than 0 mol % and less than 6 mol %. A more preferred amount of $SiO_2$ is more than 3 mol % and less than 6 mol %.

The alloy containing Cr, i.e., Co—Cr—Pt—$SiO_2$ alloy, can contain more than 0 at % and not more than 28 at % of Cr, in the above-mentioned ranges of components other than Cr (6 to 45 at % of Pt, more than 0 mol % and less than 6 mol % of $SiO_2$, and the balance of Co). Cr has a function of improving a coercivity of magnetic layer, but since Cr is a non-magnetic material, excessive addition of Cr makes the alloy non-magnetic. Therefore, an amount of Cr of not larger than 28 at % is preferred.

Although an atomic percentage (at %) is used for the Co, Cr, and Pt components as elements, and a molar percentage (mol %) is used for the $SiO_2$ component as a compound, to describe a composition of the alloy of the invention, as shown above, the sum of the contents of the respective components (the sum of Co, Cr, Pt, and $SiO_2$ contents, or of Co, Pt, and $SiO_2$ contents) represents 100%, excluding inevitable impurities.

It is considered that the smaller the crystalline grain diameter in magnetic layer, the more the medium noise can be reduced, which makes it possible to lower the noise of a magnetic recording medium. As already explained, in the invention, the crystalline grain diameter of a magnetic layer can be reduced by the addition of $SiO_2$. Preferably, the average crystalline grain diameter of the magnetic layer is 5 to 15 nanometers.

Although the thickness of the magnetic layer is not specifically limited, a thickness of 5 to 50 nanometers is appropriate, in general. A preferred thickness is 10 to 30 nanometers.

The underlayer provided under the magnetic layer of the invention is formed of a Ni-based non-magnetic material containing nickel as a main component, such as Ni—P compounds and Ni—Zr compounds. A typical example of the Ni-based non-magnetic compounds is $Ni_3P$, which is used in the aforementioned Japanese Unexamined Patent Publication (Kokai) No. 8-171716. Such an underlayer has a function of improving the properties of a layer formed thereon, particularly the coercivity and the magnetic recording properties. In addition to the above-mentioned $Ni_3P$, examples of Ni-based non-magnetic materials usable as the underlayer include $Ni_5$—$P_2$, $Ni_{67}$—$Zr_{33}$, and the like.

The underlayer preferably has a thickness of 10 to 100 nanometers. If the underlayer has a thickness of less than 10 nanometers, controlling a microstructure of the magnetic layer is difficult, resulting in a reduced coercivity and degraded magnetic recording properties. A thickness of the underlayer of more than 100 nanometers results in an extremely rough surface of the magnetic layer, which is not preferred in terms of a low flying height of the magnetic head. More preferably, the underlayer has a thickness of 50 to 100 nanometers.

The intermediate film of Cr used in the invention is not only required in terms of adhesion of the magnetic layer to a substrate, but also has an effect on the magnetic and the magnetic recording properties of the magnetic layer. The magnetic properties and magnetic recording properties of the magnetic layer depend on a microstructure of the magnetic layer, such as the crystal grain diameter and the separation between crystal grains. Also, crystal growth in the magnetic layer varies depending on the film configuration of the underlayer. Accordingly, in order to produce a magnetic layer having excellent magnetic and magnetic recording properties, the underlayer must have a good film configuration. To this end, it is useful to form a Cr film of an intermediate layer on a glass substrate at a lower base-pressure of a film-forming apparatus (which corresponds to an ultimate vacuum pressure in the apparatus), and at a higher pressure of a film-forming atmosphere (an argon atmosphere, in general). In this way, the formed Cr film has noticeable unevenness, and the underlayer formed thereon follows the unevenness, resulting in the formation of a film having a greater separation. It follows that magnetic interaction between the magnetic grains is reduced, which makes it possible to increase the coercivity of the magnetic recording medium, and reduce the medium noise.

Further, it has been found that the surface of chromium (Cr) after the formation of Cr intermediate layer may be oxidized by atmospheric exposure of the film-forming apparatus or oxygen plasma etching, to interrupt crystallographic connections between the Cr intermediate layer and the underlayer and facilitate uniform growth of grains of the underlayer, to thereby improve the magnetic recording properties of the magnetic recording medium. This can be considered to be an effect similar to that resulting in the case where an underlayer is formed directly on an aluminum substrate (Japanese Unexamined Patent Publication (Kokai) No. 8-171716).

In the invention, it is preferred that the Cr intermediate layer has a thickness of 10 to 40 nanometers in order to favorably grow crystals of the underlayer ($Ni_3P$) to obtain a magnetic recording medium suitable for high density recording. If the intermediate layer has a thickness of less than 10 nanometers, the resultant magnetic layer has a reduced separation between magnetic grains, resulting in a reduced coercivity and degraded magnetic recording properties. If the intermediate layer has a thickness exceeding 40 nanometers, the underlayer has intense roughness, resulting in abnormal growth of the magnetic layer and degraded magnetic recording properties.

Each of the layers in the magnetic recording medium of the invention, as described above, can be easily formed by a conventional sputtering technique using a target corresponding to a composition of the layer. Formation of a film by sputtering is well known, and it is not explained here in detail.

In the manufacture of the magnetic recording medium of the invention, however, it is important that the pressure during the formation of each layer is sufficient to facilitate granular growth of the layer. As described above, it is advantageous that crystals of the magnetic layer are grown in the form of granules and are isolated from one another to improve the magnetic and magnetic recording properties of the magnetic layer, and to this end, it is advantageous that the crystals on the underlayer have been also grown in the form of granules. Hitherto, the substrate is heated to be grown in the form of granules, as described, for example, in the aforementioned Japanese Unexamined Patent Publication (Kokai) No. 6-96431. However, the heating of substrate has a harmful influence. To avoid this, the invention employs a higher pressure, for forming a film, on the order of, for example, 20 to 50 mTorr (2.7 to 6.7 Pa) in place of a pressure of a few mTorr employed in a conventional film-forming process by a sputtering. Thus, by use of a higher pressure than a conventional pressure, an inert gas in a film-forming atmosphere has a higher concentration, and particles originated from a sputtering are prone to be scattered by the inert gas, and to grow granular crystals on the substrate. Similarly, to attain growth of granular crystals of the underlayer, it is advantageous that the underlying Cr intermediate layer has been granularly grown, and accordingly, it is important that the formation of the Cr intermediate layer is also carried out at a pressure facilitating granular growth of the crystals (for example, 20 to 50 mTorr (2.7 to 6.7 Pa)).

The pressure which is useful for granular growth not only depends on the crystal to be grown but also varies depending on the apparatus used for forming a film. The pressure during formation of a film should therefore be determined taking these conditions into account. However, for the purpose of facilitating granular growth by increasing the scattering of particles, it is advantageous to use a pressure of a film-forming atmosphere which is significantly higher than a pressure in a conventional film-forming process of a few mTorr, and a pressure of at least 10 mTorr (1.3 Pa).

In addition to the substrate, the Cr intermediate film, the underlayer, and the magnetic layer as described above, the magnetic recording medium of the invention can further comprise a protective film made of carbon, diamond-like carbon, carbon nitride or the like, a lubricant layer and the like, which are found in conventional magnetic recording media.

Figure 1:
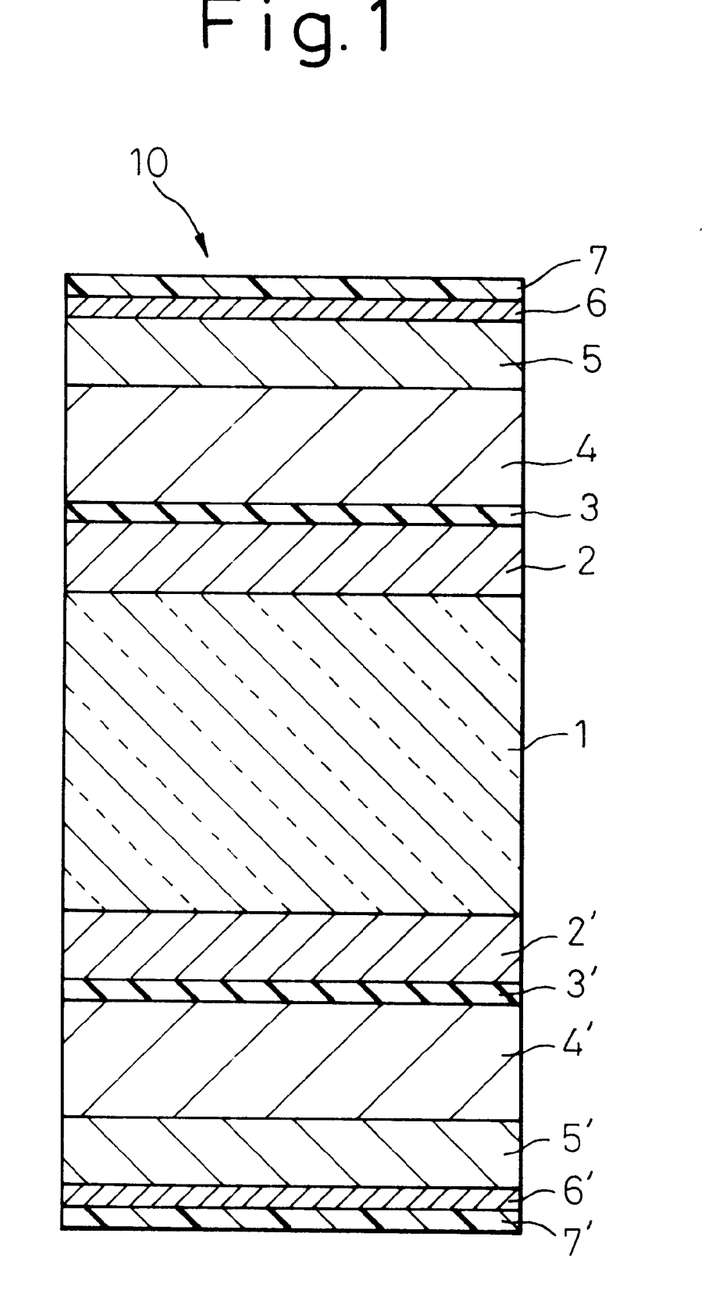
FIG. 1 illustrates an embodiment of the magnetic recording medium according to the invention.

An embodiment of the magnetic recording medium provided with these various layers is illustrated in FIG. 1. As shown in this drawing, the magnetic recording medium 10 of the invention may comprise a glass substrate 1 made of, for example, chemically strengthened glass, on which Cr intermediate layers 2, 2', oxidized Cr layers (chromium oxide layers) 3, 3', underlayers 4, 4', magnetic layers 5, 5', protective films 6, 6', and lubricant layers 7, 7' are successively formed. It should be noted that the respective layers are not shown to scale for simplicity.

The magnetic recording medium of the invention can have a higher coercivity which is favorable for the realization of high density recording. Although a coercivity is influenced by various conditions, it is possible according to the invention to obtain a magnetic recording medium having a coercivity of 1.6 kOe (127 kA/m) or more, as shown in the following examples.

EXAMPLES

The magnetic recording medium of the invention will now be illustrated by way of preferred examples.

Example 1

A chemically strengthened glass manufactured by Nippon Sheet Glass Co., Ltd. and having an outer diameter of 65 millimeters, an inner diameter of 20 millimeters, and a thickness of 0.635 millimeters, was used as a substrate. The substrate was placed in a DC/RF magnetron sputter unit (SPF-430 manufactured by Aneruba). The unit was evacuated to a pressure of $1\times10^{-6}$ Torr ($1.3\times10^{-4}$ Pa), and Ar gas was then introduced. Cr intermediate layers having different thicknesses of 5, 10, 20, 40, and 60 nanometers were formed on the glass substrate at a gas pressure which was maintained at 50 mTorr (6.7 Pa) during electrical discharge and under the conditions of an input power of 300 watts (DC magnetron) and a film-forming rate of 1.67 nanometers/second. The unit was then opened to the atmosphere and was left alone for 15 minutes, to thereby naturally oxidize the surface of the Cr intermediate layer. Subsequently, the unit was evacuated to a pressure of 2.5×10 Torr (3.3×10 Pa), and Ar gas was again introduced. An $Ni_3P$ layer having a thickness of 50 nanometers was formed on the surface-oxidized intermediate layer at a gas pressure which was maintained at 50 mTorr (6.7 Pa) during electrical discharge and under the conditions of an input power of 300 watts (DC magnetron) and a film-forming rate of 1.11 nanometers/second, and in succession, a layer of $(Co-13Cr-12Pt)_{95.4}-(SiO_2)_{4.6}$ having a thickness of 20 nanometers was formed at the same gas pressure and under the conditions of an input power of 150 watts (DC magnetron) and a film-forming rate of 0.54 nanometers/second. The unit was opened to the atmosphere, and was then evacuated again to a pressure of $1\times10^{-6}$ Torr ($1.3\times10^{-4}$ Pa), and Ar gas was again introduced. Subsequently, a carbon layer having a thickness of 8 nanometers was formed at a gas pressure which was maintained at 50 mTorr (6.7 Pa) during electrical discharge and under the conditions of an input power of 400 watts (DC magnetron) and a film-forming rate of 0.24 nanometers/second.

Comparative Example 1

Example 1 was repeated except that a Cr intermediate layer was not formed.

For the magnetic recording media made in Example 1 and Comparative Example 1, adhesion between the glass substrate and the underlayer was examined by a peeling test. In this test, pieces of a Scotch (trade mark) tape (manufactured by Sumitomo 3M) cut into 1×1 millimeter squares were stuck on a surface of a sample of magnetic recording medium, and were then peeled to indicate a percentage of the pieces to which a fragment of the film stripped from the substrate was adhered, per 100 pieces of stuck tape. As shown in Table 1, peeling of film was not observed in the samples having the Cr intermediate layer (the invention), and significant peeling of film was observed in the samples having no Cr intermediate layer (comparative example). Consequently, it was found that a Cr intermediate layer is necessary to supplement adhesion between a glass substrate and an underlayer. The adhesion between a substrate and an underlayer is particularly important because of frequent occurrence of contact of a magnetic recording medium with a magnetic head when the magnetic recording medium is incorporated in a hard disk drive.

TABLE 1

| | percent of film peeling |
|---|---|
| No Cr intermediate layer | 24% |
| Cr intermediate layer, 5 nanometers | 0% |
| Cr intermediate layer, 20 nanometers | 0% |
| Cr intermediate layer, 60 nanometers | 0% |

Figure 2:
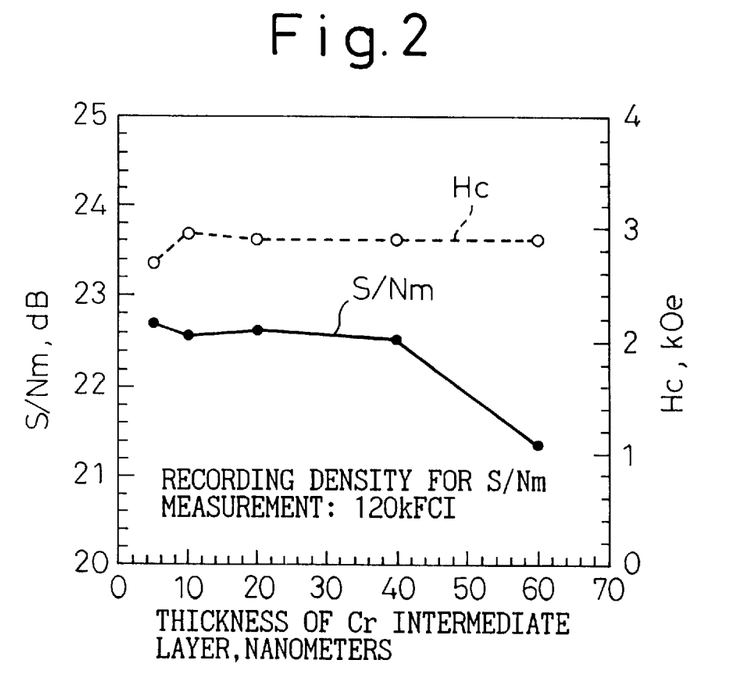
FIG. 2 shows a relation between a thickness of the Cr intermediate film of Example 1 and coercivity Hc and S/Nm (medium noise) of the magnetic recording medium.

FIG. 2 shows the relationship between the thickness of the Cr intermediate film of Example I and the coercivity Hc and S/Nm (medium S/N). S/Nm is an S/N ratio calculated using, as a quantity of noise, a quantity of medium noise (Nm), which is obtained by deducting head noise and circuit noise from a total noise. Since the SN/m thus picks out only noise resulted from a medium, it is often used to evaluate magnetic recording properties of the medium with the exclusion of factors other than factors due to the medium, such as those due to a magnetic head and a device. As shown in FIG. 2, the coercivity Hc varies very little in a range of thickness of the Cr intermediate layer of 10 to 60 nanometers, although it is slightly smaller at a thickness of 5 nanometers. On the other hand, the S/Nm also varies very little in a range of thickness of Cr intermediate layer of 10 to 40 nanometers, and is reduced when the thickness is increased to 60 nanometers. Consequently, it is found that a thickness of Cr intermediate layer of 10 to 40 nanometers can provide a magnetic recording medium appropriate for high density recording.

Example 2

Example 1 was repeated to make a magnetic recording medium provided with a Cr intermediate layer of 20 nanometers thick, except that the surface of the intermediate layer was not oxidized by exposing the layer to the atmosphere after formation. The magnetic properties of the resultant magnetic recording medium are shown in Table 2 with those in Example 1 (Cr intermediate layer of 20 nanometers thick).

TABLE 2

| | Hc, kOe | S/Nm, dB |
|---|---|---|
| Exposure to air after formation of Cr layer | 2.808 | 18.4 |
| No exposure to air after formation of Cr layer | 2.857 | 17.9 |

Recording density for S/Nm measurement: 160 kFCI

From the results shown in the table, it can be seen that a coercivity Hc is enhanced by oxidizing the surface of the Cr intermediate layer through exposure to air. From this, it is thought that the surface of the Cr intermediate layer was oxidized by the exposure to air, and had increased roughness, to thereby facilitate particular growth of the underlayer and magnetic layer through a synergistic effect with a high gas pressure process, and whereby magnetic interaction between magnetic grains was reduced to contribute the increase in coercivity. Consequently, it is found that oxidizing the surface of the Cr intermediate layer after the formation thereof is favorable for obtaining a magnetic recording medium appropriate for high density recording.

Example 3

Figure 3:
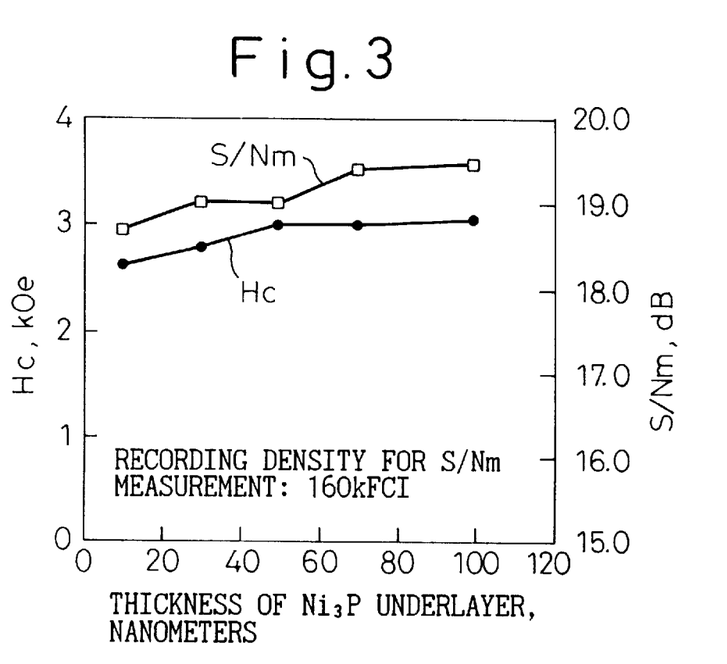
FIG. 3 shows a relation between a thickness of the $Ni_3P$ underlayer of Example 3 and coercivity Hc and S/Nm (medium noise) of the magnetic recording medium.

Effect of the thickness of an underlayer on magnetic properties and magnetic recording properties of a magnetic recording medium were examined by varying the thickness of the underlayer, with the thickness of Cr intermediate layer being fixed at 20 nanometers. Magnetic recording media were made using conditions equivalent to those in Example 1 and different thicknesses of $Ni_3P$ underlayer of 10, 30, 50, 70, and 100 nanometers. As shown in FIG. 3, both coercivity Hc and S/Nm are increased as the thickness of the $Ni_3P$ underlayer is increased, and the increase is still observed even at a thickness of the $Ni_3P$ underlayer of 100 nanometers. However, it is deemed that a thickness of $Ni_3P$ underlayer of the order of 100 nanometers is the practical upper limit because the greater the thickness of underlayer, the greater the roughness of surface and also abnormal protuberances appear. Consequently, it has been found that a preferred thickness of underlayer is 1 to 100 nanometers which provides a sufficient coercivity for high density recording and an appropriate surface roughness.

Example 4

To examine the effects of $SiO_2$ content in a magnetic Co—Cr—Pt—$SiO_2$ film on the magnetic and magnetic recording properties of a magnetic recording medium, magnetic recording media which had different $SiO_2$ contents X of 0, 3.3, 4.6, 5.1, and 5.6 mol % in a magnetic layer of $(Co—13Cr—12Pt)_{100-x}$—$(SiO_2)_x$ were made in the same way as in Example 1, the media having a Cr intermediate layer of 20 nanometers thick and an $Ni_3P$ underlayer of 30 nanometers thick. Table 3 shows results of the measurement of coercivity Hc and S/Nm of the obtained magnetic recording media. As can be seen from the table, the coercivity Hc is greatly enhanced with the addition of 3.3 mol % of $SiO_2$ as compared with no addition of $SiO_2$, it being a maximum near this addition rate, and it decreases with further addition of $SiO_2$. At an $SiO_2$ addition rate of 5.1 mol %, the coercivity is lower than 2 kOe (159 kA/m), and at the addition rate of 5.6 mol %, a low coercivity makes it difficult to measure the magnetic recording properties. Consequently, by use of an $SiO_2$ content of more than 0 mol % and less than 6 mol %, a magnetic recording medium appropriate for high density recording can be obtained.

TABLE 3

| SiO$_2$ added, mol % | Hc, kOe | S/Nm, dB |
|---|---|---|
| 0 | 2.064 | not measured |
| 3.3 | 3.264 | 18.5 |
| 4.6 | 2.637 | 18.4 |
| 5.1 | 1.906 | 17.6 |
| 5.6 | 1.598 | 9.8 |

Recording density for S/Nm measurement: 160 kFCI

Example 5

Figure 4:
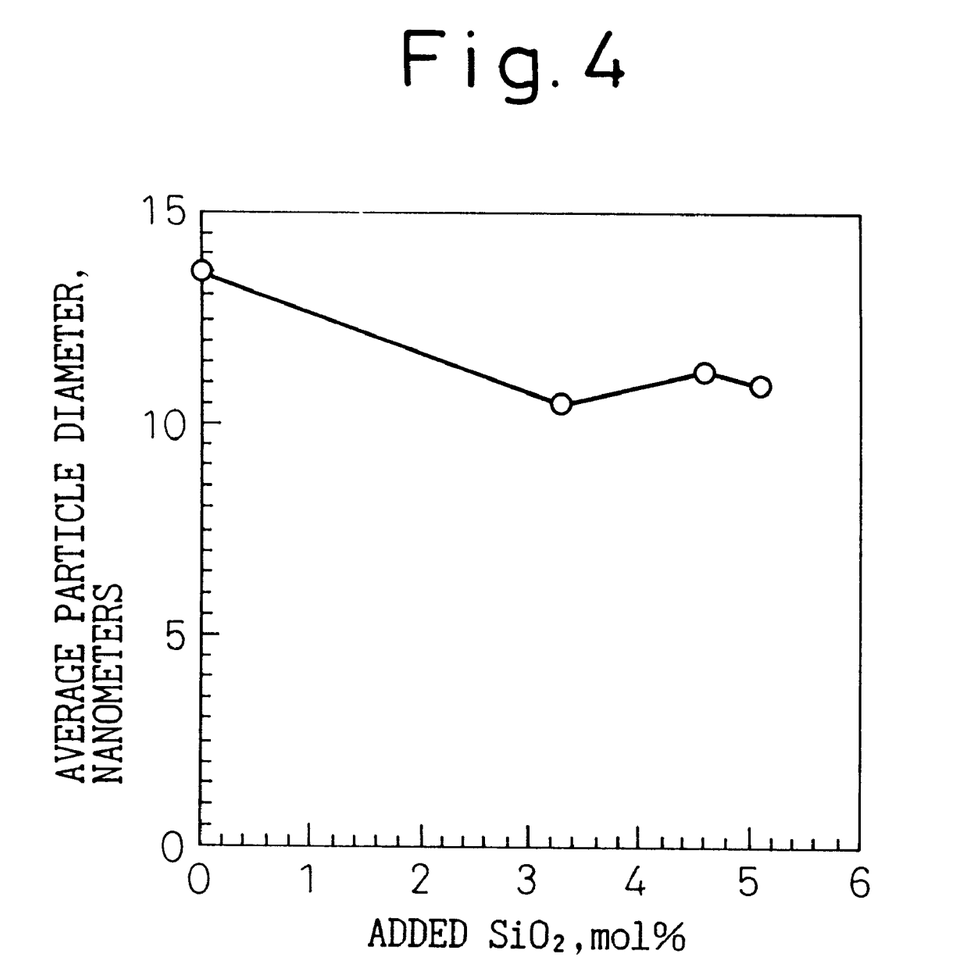
FIG. 4 shows a relation between an amount of $SiO_2$ added and an average crystalline grain diameter of the magnetic layer in Example 5.
Figure 5:
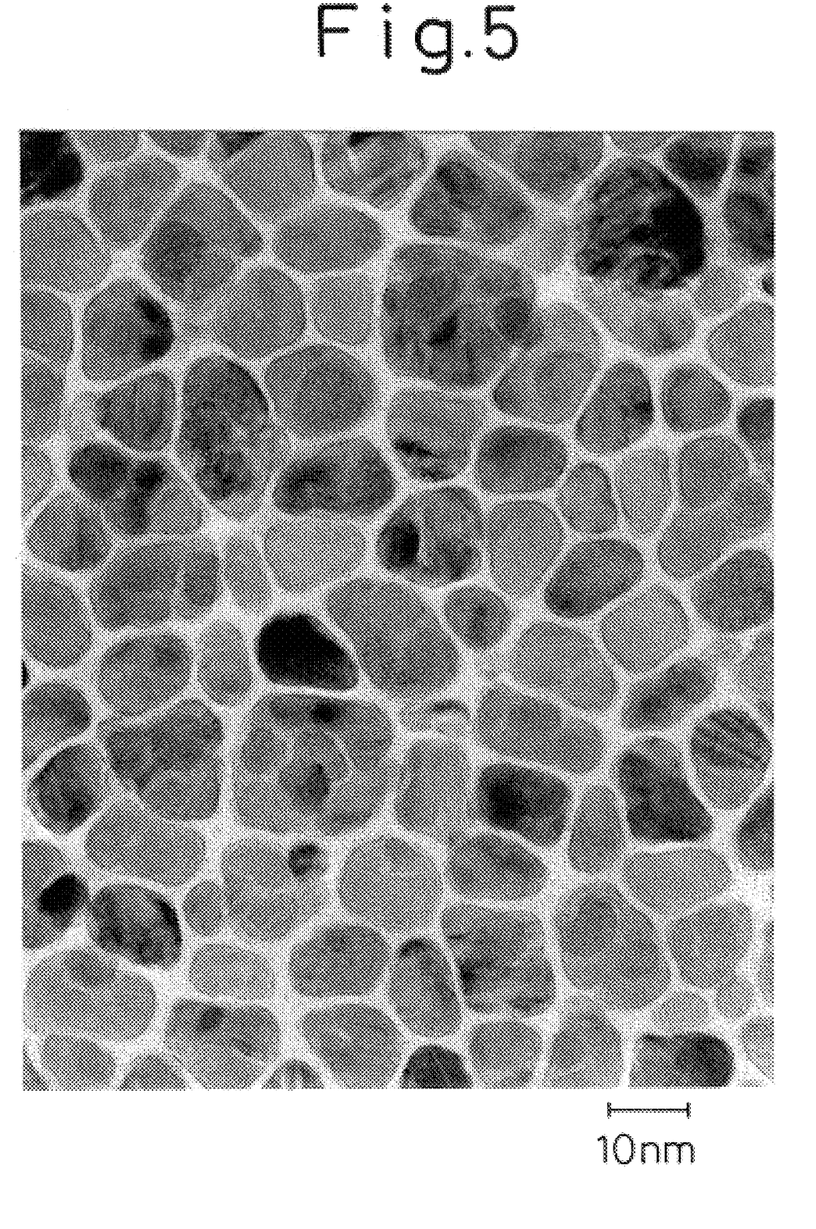
FIG. 5 is a plane transmission electron micrograph of the crystal grain of the magnetic layer in Example 5.

A magnetic recording media having an amount of SiO$_2$ in the range of 0 to 5.1 mol % were made under the same film-forming conditions as in Example 1. As a result, an average crystal grain diameter which was 13.5 nanometers with no addition of SiO$_2$ was reduced to 11 nanometers by addition of SiO$_2$, as shown in FIG. 4. The average crystal grain diameters were determined by a plane transmission electron micrograph. A plane transmission electron micrograph at the addition of 4.6 mol % of SiO$_2$ is shown in FIG. 5.

Example 6

To examine effects of Cr and Pt contents in a magnetic Co—Cr—Pt—SiO$_2$ film on magnetic and magnetic recording properties of a magnetic recording medium, magnetic recording media which had different Cr and Pt contents were made in the same way as in Example 1, the media having a Cr 20 nanometer thick intermediate layer and a 30 nanometer thick Ni$_3$P underlayer. Table 4 shows results of the measurement of coercivity Hc and S/Nm of the resultant magnetic recording media. As can be seen from the first four data, both coercivity Hc and S/Nm are increased by the increase in Cr content, but are reduced by excessive addition of Cr. At the Cr content of 27 at %, the coercivity Hc is less than 1.6 kOe (127 kA/m), and measurement of magnetic recording properties becomes difficult due to demagnetization of the record. However, by adjusting a Pt content, the coercivity can be 1.6 kOe (127 kA/m) or more, as seen in the eighth data of Table 8. Therefore, a Cr content of 28 at % or less is preferred. Although an increased Cr content results in increase in anisotropic magnetic field (Hk), which increases, in turn, the coercivity, the excessive addition of Cr increased non-magnetic regions in the Co alloy, resulting in the great reduction in coercivity.

TABLE 4

| Magnetic layers | Hc, kOe | S/Nm, dB |
|---|---|---|
| Co-13Cr-12Pt-3(SiO$_2$) | 3.264 | 18.5 |
| Co-19Cr-12Pt-3(SiO$_2$) | 3.512 | 19.2 |
| Co-25Cr-12Pt-3(SiO$_2$) | 2.212 | 16.3 |
| Co-27Cr-12Pt-3(SiO$_2$) | 1.402 | 8.6 |
| Co-13Cr-9Pt-3(SiO$_2$) | 2.432 | 19.3 |
| Co-13Cr-6Pt-3(SiO$_2$) | 1.562 | 8.7 |
| Co-13Cr-17Pt-3(SiO$_2$) | 3.903 | recording impossible |
| Co-27Cr-17Pt-3(SiO$_2$) | 1.991 | 17.7 |

Recording density for S/Nm measurement: 160 kFCI

Comparing the first and fifth to seventh data in Table 4, it can be seen that coercivity is simply increased as the Pt content is increased from 6 at % to 17 at %. When the amount of Pt added is 6 at %, the coercivity is reduced to lower than 2 kOe (159 kA/m) and the S/Nm is also deteriorated. At the coercivity of 3.9 kOe (310 kA/m) (the amount of Pt added of 17 at %), sufficient magnetic recording could not be carried out because of poor capacity, of recording, of the current magnetic head. However, based on the grounds described above, it is thought that an amount of Pt added which provides a practical coercivity is 6 to 45 at %.

Example 7

Magnetic recording media ware made under the same conditions as those in Example 1, except that Cr was not added in the magnetic material, and the rate of formation of the magnetic layer was varied. As can be seen from the results given in Table 5, even if Cr is not added in the magnetic layer, a high coercivity of 2 kOe (159 kA/m) or more can be obtained by varying the rate of formation of the magnetic layer. Namely, the coercivity was enhanced as the rate of formation of magnetic layer was decreased and a high coercivity of 2.81 koe (223 kA/m) was obtained.

TABLE 5

| Rate of forming magnetic layer, nm/sec | Hc, kOe |
|---|---|
| 21.7 | 1.878 |
| 1.54 | 2.204 |
| 0.62 | 2.376 |
| 0.21 | 2.810 |

Example 8

Figure 6:
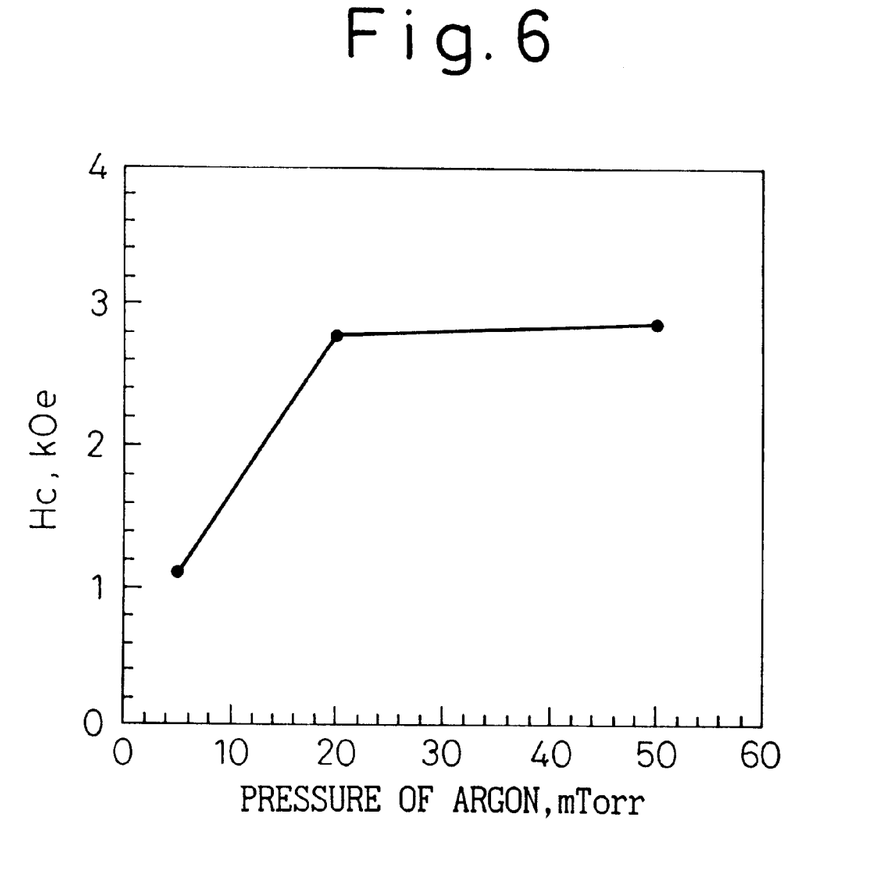
FIG. 6 shows a relation between a pressure of argon and a coercivity Hc in Example 8.

Effects of a pressure of inert gas during the formation of layers on magnetic properties were examined. Magnetic recording media were made in the same way as in Example 1, except for the use of different pressures of argon of 5, 20, and 50 mTorr (0.67, 2.7, and 6.7 Pa) for each of the formations of Cr intermediate layer, Ni$_3$P underlayer, and magnetic Co—Cr—Pt—SiO$_2$ layer. The results of measurement of the coercivity Hc of the produced magnetic recording media are shown in FIG. 6. The increase in coercivity at a pressure of argon of from 5 mTorr (0.67 Pa) to 20 mTorr (2.7 Pa) is drastic, and the increase at a pressure of between 20 mTorr (2.7 Pa) to 50 mTorr (6.7 Pa) was small. At a pressure of 5 mTorr (0.67 Pa), the magnetic recording medium has a coercivity of less than 1.6 kOe (127 kA/m), which is not appropriate for high density recording. Consequently, it can be seen that a preferred magnetic recording medium is obtained at 20 mTorr (2.7 kPa) or more, but a pressure for practical use should be determined for each apparatus for forming layers, because the pressure during the film formation, which has an effect on the properties of a magnetic recording medium, as mentioned above, is influenced by the apparatus used.

As described above, the magnetic recording medium of the invention has an improved adhesion of the overlying layers to a glass substrate as compared with prior magnetic recording medium. In addition, according to the invention, the magnetic recording medium magnetic properties are improved by controlling configuration of the film of a magnetic layer by improving the underlayer and optimizing the composition of the magnetic layer, and thus has a good magnetic recording properties, and is appropriate for high density recording.

What is claimed is:

1. A magnetic recording medium comprising a substrate, a magnetic layer of Co-based magnetic alloy, and an underlayer of Ni-based non-magnetic material interposed between the substrate and the magnetic layer, wherein the magnetic recording medium further comprises an intermediate layer of Cr having a thickness of 10 to 40 nanometers between the substrate and the underlayer,
   wherein the Co-based magnetic alloy in the magnetic layer is a Co—Cr—Pt or Co—Pt alloy which predominantly contains Co and in which $SiO_2$ is added.

2. The magnetic recording medium of claim 1, wherein an oxidized Cr layer is present between the intermediate layer of Cr and the underlayer.

3. The magnetic recording medium of claim 1, wherein the Co-based magnetic alloy is an alloy containing 6 to 45 at % of Pt, more than 0 mol % and less than 6 mol % of $SiO_2$, the balance being Co and inevitable impurities.

4. The magnetic recording medium of claim 1, wherein the Co-based magnetic alloy is an alloy containing more than 0 at % and not more than 28 at % of Cr, 6 to 45 at % of Pt, more than 0 mol % and less than 6 mol % of $SiO_2$, the balance being Co and inevitable impurities.

5. The magnetic recording medium of claim 1, wherein the magnetic layer has an average crystal grain diameter of 5 to 15 nanometers.

6. The magnetic recording medium of claim 1, wherein the Ni-based non-magnetic material in the underlayer is a Ni—P or Ni—Zr compound which predominantly contains Ni.

7. The magnetic recording medium of claim 6, wherein the underlayer has a thickness of 10 to 100 nanometers.

8. The magnetic recording medium of claim 1, which has a coercivity of 1.6 kOe (127 kA/m) or more.

9. A method of producing a magnetic recording medium which comprises providing a substrate, forming an intermediate layer of Cr having a thickness of 10 to 40 nanometers on the substrate, forming an underlayer of Ni-based non-magnetic material on the intermediate layer, and forming a magnetic layer of Co-based magnetic alloy on the underlayer, wherein each of the layers is formed by a sputtering process at a sufficient pressure to promote granular growth of crystal of the layer,
   wherein the magnetic layer is formed of a Co—Cr—Pt or Co—Pt alloy which predominantly contains Co and in which $SiO_2$ is added.

10. The method of claim 9, wherein after the formation of the intermediate layer and before the formation of the underlayer, the surface of the intermediate layer is oxidized.

11. The method of claim 10, wherein the alloy contains 6 to 45 at % of Pt, more than 0 mol % and less than 6 mol % of $SiO_2$, the balance being Co and inevitable impurities.

12. The method of claim 10, wherein the alloy contains more than 0 at % and not more than 28 at % of Cr, 6 to 45 at % of Pt, more than 0 mol % and less than 6 mol % of $SiO_2$, the balance being Co and inevitable impurities.

13. The method of claim 10, wherein the underlayer is formed of a Ni—P or Ni—Zr compound which predominantly contains Ni.

14. A method of producing a magnetic recording medium which comprises providing a substrate, forming an intermediate layer of Cr having a thickness of 10 to 40 nanometers on the substrate, forming an underlayer of Ni-based non-magnetic material on the intermediate layer, and forming a magnetic layer of Co-based magnetic alloy on the underlayer, wherein each of the layers is formed by a sputtering process at a sufficient pressure to promote granular growth of crystal of the layer,
   wherein after the formation of the intermediate layer and before the formation of the underlayer, the surface of the intermediate layer is oxidized, and
   wherein the alloy contains 6 to 45 at % of Pt, more than 0 mol % and less than 6 mol % of $SiO_2$, the balance being Co and inevitable impurities.

15. A method of producing a magnetic recording medium which comprises providing a substrate, forming an intermediate layer of Cr having a thickness of 10 to 40 nanometers on the substrate, forming an underlayer of Ni-based non-magnetic material on the intermediate layer, and forming a magnetic layer of Co-based magnetic alloy on the underlayer, wherein each of the layers is formed by a sputtering process at a sufficient pressure to promote granular growth of crystal of the layer,
   wherein after the formation of the intermediate layer and before the formation of the underlayer, the surface of the intermediate layer is oxidized, and
   wherein the alloy contains more than 0 at % and not more than 28 at % of Cr, 6 to 45 at % of Pt, more than 0 mol % and less than 6 mol % of $SiO_2$, the balance being Co and inevitable impurities.

* * * * *